March 18, 1924.
H. T. TEBAY
ADJUSTABLE TRACTOR HITCH
1,487,188
Original Filed March 22, 1921
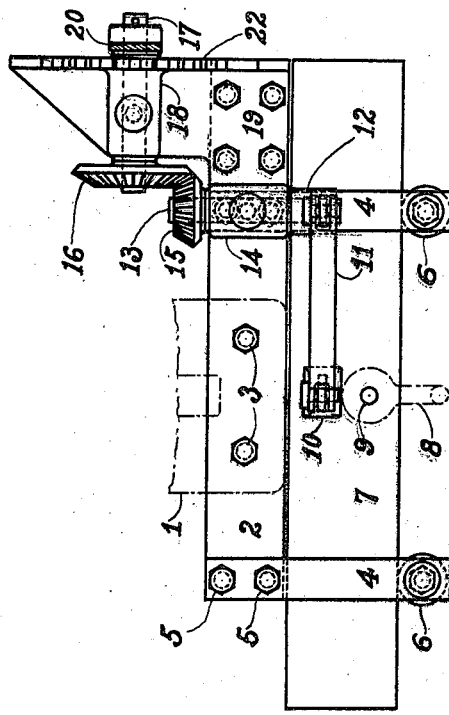
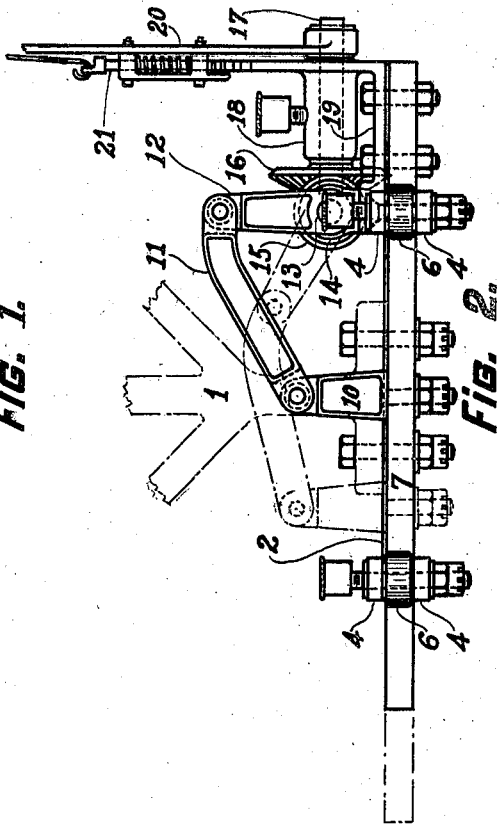
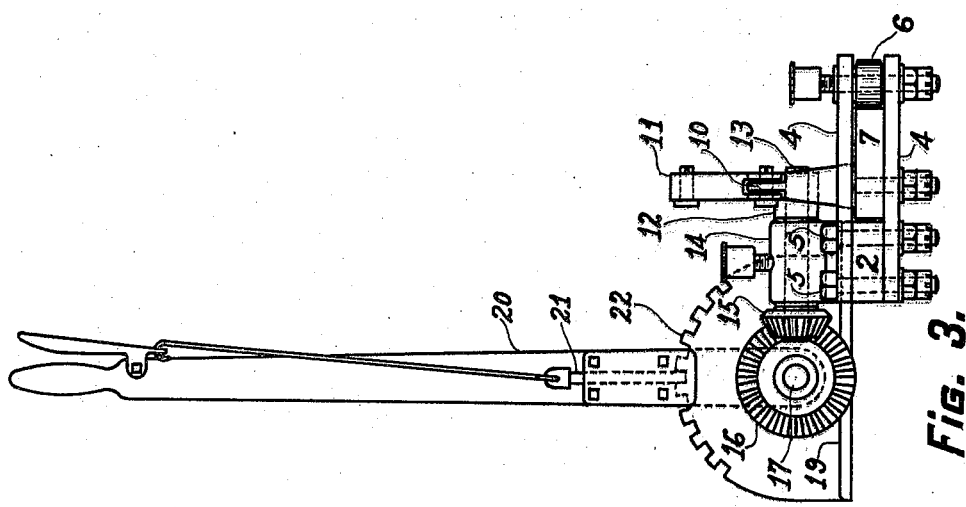
INVENTOR
Harry T. Tebay,
BY
Winter Brown,
ATTORNEYS Patented Mar. 18, 1924.

1,487,188

UNITED STATES PATENT OFFICE.

HARRY T. TEBAY, OF BUTLER, PENNSYLVANIA, ASSIGNOR OF ONE-HALF TO EDGAR C. HUSELTON, OF BUTLER, PENNSYLVANIA.

ADJUSTABLE TRACTOR HITCH.

Application filed March 22, 1921, Serial No. 454,559. Renewed August 29, 1923.

*To all whom it may concern:*

Be it known that I, HARRY T. TEBAY, a citizen of the United States, and a resident of Butler, in the county of Butler and State of Pennsylvania, have invented a new and useful Improvement in Adjustable Tractor Hitches, of which the following is a specification.

The invention relates to means on a tractor for hitching thereto a plow or other implement, which means is so arranged that the attachment of the plow or other implement to the tractor is adjustable laterally of the tractor.

In plowing with a tractor on sloping or rolling ground there is a tendency for the plow to sag down hill. This must be compensated for by changing the point of attachment of the plow to the tractor, and is ordinarily done by means of a pin connection which requires the tractor to be stopped, the pin removed and adjusted to a different pin hole laterally of the tractor. The same need for adjustment occurs in plowing curves, to offset the line of draft between the tractor and the plow, in order that the plow will cut only so much ground as it can handle. The same need also applies to the attachment of other implements, besides plows, to the tractor.

The present invention has for its purpose to provide a connecting means, or "hitch" as it is called, which can be quickly shifted, without the necessity of stopping the tractor, and therefore can be made as frequently as desired in plowing a furrow, by the simple means of a shifting lever, without requiring the driver to leave his seat, and so quickly as to not interfere with the proper steering of the tractor.

A further object is to provide a device of the character described which is of simple construction, strong and durable; which has no parts which are subject to excessive wear or affected by dust, dirt or sand; which is rigid and will withstand severe backing stresses without distorting the device or affecting the operating parts thereof; which is secured to the tractor by simple means which permit of its quick attachment to and removal from the tractor; which does not increase the length of coupling to such extent that the controlling levers of the plow or other implement are inconvenient to operate; and one in which the position of the plow attachment relative to the center line of the tractor is indicated by the position of the shifting lever, so as to obviate any liability on the part of the driver to shift the same in the wrong direction.

In the accompanying drawings Fig. 1 is a plan view of the device; Fig. 2 is a rear elevation of the same; and Fig. 3 is an end or side elevation of the same looking from the left, Figs. 1 and 2.

On the drawings 1 indicates what is known as the tractor attachment, that is, the part at the rear of the tractor to which the plow or other implement is ordinarily attached. This part is merely illustrated typically and may be the hitching member of any tractor.

The adjustable hitch device comprises an attachment member 2 which is in the form of a short flat metal bar arranged to be rigidly secured to the tractor attachment 1 by the simple means of a pair of bolts 3. The member 2 has secured thereto by suitable means, such as bolts 5, a pair of guide members 4, each of which comprises a pair of flat bars parallel to each other, one lying above the attachment member 2 and the other below the same, thus forming between them a horizontal guide space equal to the thickness of the attachment member 2. Between the rear ends of each pair of bars is a roller 6, rotating on a vertical axis suitably mounted in said bars. Between these guide bars is a transversely shiftable member 7 also in the form of a flat metal bar rectangular in cross section and of slightly less thickness than the spaces between the pairs of bars 4, with its rear edge bearing against the rollers 6. The plow or other implement is attached to the shiftable bar 7 by any suitable means, such as the clevis 8 and pin 9 fastened through a hole in the bar.

The bar 7 is shifted laterally by the following means:

A post 10 is secured to the bar, preferably by having a circular lower end passing through a suitable hole in the bar. To the upper end of this post is pivotally secured one end of a connecting rod 11, the opposite end of which is pivotally secured to the outer end of a crank arm 12 carried on the rear end of a short shaft 13 mounted in a bearing 14 suitably formed on or secured to the attachment member 2, said shaft having its axis horizontal and parallel to the center line of the tractor. The forward end of shaft 13 carries a beveled pinion 15 meshing with a similar pinion 16, carried by one end of a short horizontal transverse shaft 17, mounted in a bearing 18 formed in or secured to a forward extension 19 from the connecting member 2. To the outer end of shaft 17 is secured a lever 20 provided with an ordinary hand-controlled locking dog 21, cooperating with a notched segment 22 formed on or secured to the extension 19.

The pinion 16 is preferably of double the size of pinion 15. As shown, the parts are so arranged that when the plow or other attachment 8 is at the center line of the tractor, as shown in Fig. 1, the lever 20 stands in upright position. By pushing said lever forward the shaft 13 is rocked and through the crank arm 12 and connecting rod 11 the bar 7 is shifted toward the left, viewing Figs. 1 and 2, and when said lever 20 is moved rearwardly the said bar 7 is shifted toward the right. The position of this lever therefore indicates the position of the plow attachment relative to the center line of the tractor, and consequently the driver will not be liable to start the shifting movement in the wrong direction. The shifting can be effected almost instantaneously, by the simple act of pushing the lever 20 either forwardly or backwardly, without in any way interfering with the forward movement of the tractor or with its proper guidance, and consequently can be made as frequently during the plowing of a furrow as the slope of the land or other condition may make necessary.

The device described is of simple strong construction. The parts are compact, and so arranged that they cannot become distorted or bent by backing the tractor, and therefore the operative parts are not liable to become disarranged. The device as a whole can be quickly attached to or detached from the tractor by merely inserting or removing the two bolts 3. No parts of the device are subject to excessive wear, nor can they be seriously affected by sand, dust, or dirt getting into the parts. The increase in the length of coupling is only a few inches, namely, the longitudinal distance between the center lines of bolts 3 and pin 9, and consequently the controlling levers of the plow or other implement will be readily accessible.

The holes for the attaching pin 9 and for the post 10 preferably are so spaced relative to the width of bar 7 that if said bar should wear on its rear edge it can be reversed, bringing its front edge to the rear, by simply disconnecting the pin 9 and post 10, and after reversing the bar, reconnecting them in the proper position. The rollers 6 permit of the easy shifting of the bar 7, even when under the full load of the draft, and also reduce wear on the rear edge of the bar 7. Preferably the bearings of these rollers, as well as the bearings for shafts 13 and 17 are provided with grease or oil cups, as shown.

I claim:

1. An adjustable tractor hitch comprising in combination, a member for attachment to the tractor and provided with horizontal lateral guiding means, a transversely sliding member having parallel front and rear guiding faces mounted in said guiding means and provided with means for connection thereto of a plow or other implement, actuating means attached to the said sliding member for shifting the same in opposite directions, the points of attachment to the sliding member of said means for connection and said actuating means being disposed relatively to each other whereby to render the sliding member reversible face for face.

2. An adjustable tractor hitch comprising, in combination, a member for attachment to the tractor and provided with rearwardly extending lateral guiding means, a transversely sliding member mounted in said guiding means and provided with means for connection thereto of a plow or other implement, a pivoted lever, operative connections therefrom to said sliding member arranged to shift the same in opposite directions, said sliding member having parallel front and rear faces and having the attachments thereto of the plow and operating connections so located that said sliding member can be reversed edge for edge.

3. An adjustable tractor hitch comprising, in combination, a member for attachment to the tractor and provided with horizontal lateral guiding means, a transverse sliding member mounted in said guiding means and provided with means for connection thereto of a plow or other implement, a shaft mounted on said attachment member parallel to the longitudinal axis of the tractor, operative connections from one end of said shaft to said sliding member, a beveled pinion on the opposite end of said shaft, a beveled pinion intermeshing with said first named pinion, and an actuating lever operatively connected to said last named beveled pinion.

4. An adjustable tractor hitch comprising, in combination, a transverse flat bar for attachment to the tractor, rearwardly projecting bifurcated arms attached to said transverse bar and forming a lateral horizontal guide, a transverse sliding member mounted in said bifurcated arms and provided with means for connection thereto of a plow or other implement, a pivoted actuating lever mounted on said transverse bar, a rocking member arranged to be actuated by said lever, and connections from said rocking member to said sliding member for shifting the latter, the points of attachment to the sliding member of said connections and said means being disposed relatively to each other whereby to render the sliding member reversible.

5. An adjustable tractor hitch comprising, in combination, a transverse flat bar for attachment to the tractor, two pair of rearwardly projecting bars, each pair being attached respectively to the top and bottom of said transverse bar, vertical rollers mounted in the rear ends of said bars, whereby said bars form a lateral horizontal guide, a transversely sliding bar mounted between said rearwardly projecting bars and provided with means for connection thereto of a plow or other implement, a pivoted actuating lever mounted on said transverse bar, a rocking member arranged to be actuated by said lever, and connections from said rocking member to said sliding member for shifting the latter.

In testimony whereof, I have hereunto set my hand.

HARRY T. TEBAY.

Witnesses:
R. H. GRAHAM,
JOHN S. JACK.